(12) United States Patent
Sherry

(10) Patent No.: US 12,063,253 B2
(45) Date of Patent: Aug. 13, 2024

(54) ENHANCED USER AUTHENTICATION SYSTEM AND METHOD

(71) Applicant: CenturyLink Intellectual Property LLC, Broomfield, CO (US)

(72) Inventor: Justin Sherry, Windsor, CO (US)

(73) Assignee: CenturyLink Intellectual Property LLC, Broomfield, CO (US)

(*) Notice: Subject to any disclaimer, the term of this patent is extended or adjusted under 35 U.S.C. 154(b) by 272 days.

(21) Appl. No.: 17/817,718

(22) Filed: Aug. 5, 2022

(65) Prior Publication Data

US 2023/0047380 A1 Feb. 16, 2023

Related U.S. Application Data

(60) Provisional application No. 63/231,456, filed on Aug. 10, 2021.

(51) Int. Cl.
 *H04L 9/40* (2022.01)
(52) U.S. Cl.
 CPC ............ *H04L 63/20* (2013.01); *H04L 63/08* (2013.01)

(58) Field of Classification Search
 CPC ..... H04L 63/20; H04L 63/08; H04L 63/0892; H04L 63/083
 See application file for complete search history.

(56) References Cited

U.S. PATENT DOCUMENTS

| | | | | |
|---|---|---|---|---|
| 9,344,427 B1* | 5/2016 | Mehta | .............. | H04L 63/0884 |
| 2012/0023558 A1* | 1/2012 | Rafiq | .............. | H04L 63/08 |
| | | | | 709/202 |

* cited by examiner

*Primary Examiner* — Izunna Okeke

(57) ABSTRACT

Systems and methods are provided to utilize information from a directory service to determine, at a layer-one network policy server, the appropriate layer-two network policy server to which an authentication request should be routed. For example, a first directory service group may be created that includes all users using a first authentication type, a second directory service group may be created that includes all users using a second authentication type, etc. The layer-one network policy server may periodically synchronize with the directory service to download information about users in the different directory service groups, update a markup language document with that information, and use the markup language document to help route incoming authentication requests to the correct layer-two network policy server for a particular authentication type. In addition, a priority may be set (and changed) by an administrator favoring one or more authentication types in a network.

15 Claims, 6 Drawing Sheets

ENHANCED USER AUTHENTICATION SYSTEM AND METHOD

CROSS-REFERENCE TO RELATED APPLICATIONS

This application claims the benefit of U.S. Provisional Application No. 63/231,456 filed 10 Aug. 2021, entitled "Enhanced User Authentication System and Method," which is incorporated herein by reference in its entirety.

BACKGROUND

In a sophisticated computing network, it is possible for users to employ multiple different kinds of authentication methods. For example, an organization may require multi-factor authentication, where a user must first authenticate using a user name and password and also authenticate with a secondary authentication method. The secondary authentication method may vary. For example, some users may use a first type of authentication token, while other users may use a second type of authentication token, while other uses may use a third type of authentication token in order to satisfy the secondary authentication requirement in a multi-factor authentication scheme. It is with respect to this general technical environment that aspects of the present systems and methods are directed.

SUMMARY

In exemplary embodiments, a method for authenticating a user of a computing network is provided. A layer-one network policy server may receive information from a directory service identifying groups of users by the authentication type(s) selected by the users. The layer-one network policy server may then receive an authentication request from a client computing device associated with a user, the authentication request including identifying information. The layer-one network policy server may then determine, based on the identifying information and the information from the directory service, whether the user is a member of a first directory service group. When the user is a member of the first directory service group, the layer-one network policy server may route the request to a first layer-two network policy server operating as a first type of network authenticator. When the user is not a member of the first directory service group, the layer-one network policy server may determine whether the user is a member of a second directory service group. When the user is a member of the second directory service group, the layer-one network policy server may then route the request to a second layer-two network policy server operating as a second type of network authenticator. When the user is not a member of the second directory service group, the layer-one network policy server may route the request to a third layer-two network policy server operating as a third type of network authenticator. An authentication response is then received at the layer-one network policy server and provided to the client computing device.

In further exemplary embodiments, a system for authenticating a user of a computing network is provided. In examples, the system may comprise at least one processor and memory, operatively connected to the at least one processor and storing instructions that, when executed by the at least one processor, cause the at least one processor to perform a method. In examples, the method may include a layer-one network policy server receiving information from a directory service identifying groups of users by the authentication type(s) selected by the users. The layer-one network policy server may then receive an authentication request from a client computing device associated with a user, the authentication request including identifying information. The layer-one network policy server may then determine, based on the identifying information and the information from the directory service, whether the user is a member of a first directory service group. When the user is a member of the first directory service group, the layer-one network policy server may route the request to a first layer-two network policy server operating as a first type of network authenticator. When the user is not a member of the first directory service group, the layer-one network policy server may determine whether the user is a member of a second directory service group. When the user is a member of the second directory service group, the layer-one network policy server may then route the request to a second layer-two network policy server operating as a second type of network authenticator. When the user is not a member of the second directory service group, the layer-one network policy server may route the request to a third layer-two network policy server operating as a third type of network authenticator. An authentication response is then received at the layer-one network policy server and provided to the client computing device.

DETAILED DESCRIPTION

Figure 1:
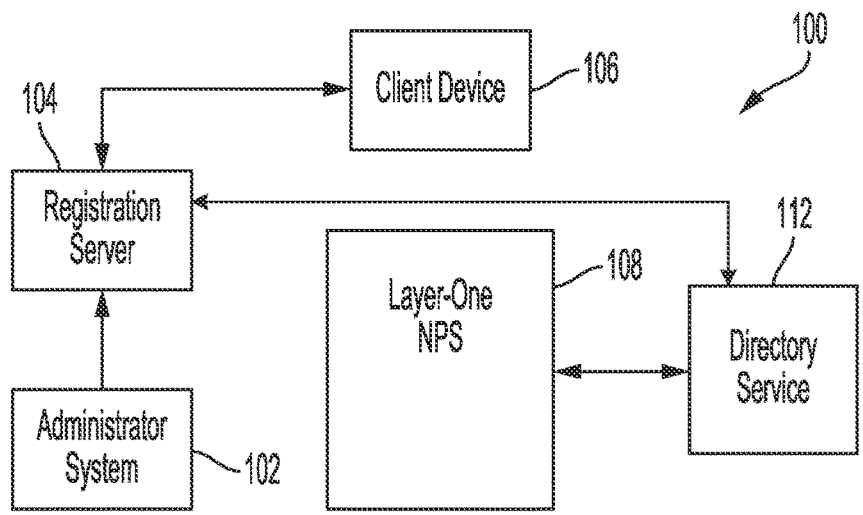
FIG. 1 depicts an example a user registration system according to the present application.

In a computing network, multiple different methods of authentication may be supported. For example, an organization controlling a computing network may employ multi-factor authentication. A user may first authenticate with a user name and password and then also authenticate with a secondary authentication method. For example, the secondary authentication method may support a user presenting one of several different types of authentication tokens from different vendors (e.g., KnownAccess, Azure, Gemalto, etc.). However, it can be expensive and inefficient for an organization to support multiple different types of authentication tokens. As such, present systems and methods improve the efficiency of supporting multiple authentication types, as well as simplifying the process of supporting new authentication types and phasing out other authentication types, while keeping the network secure.

In examples, the present systems and methods utilize information from a directory service to determine, at a layer-one network policy server, the appropriate layer-two network policy server to which an authentication request should be routed. For example, a first directory service group may be created that includes all users using a first authentication type, a second directory service group may be created that includes all users using a second authentication type, and a third directory service group may be created that includes all users using a third authentication type, etc. The layer-one network policy server may periodically synchronize with the directory service to download information about users in the different directory service groups, update a markup language document with that information, and use the markup language document to help route incoming authentication requests to the correct layer-two network policy server for a particular authentication type.

In addition, a priority may be set (and changed) by an administrator favoring one or more authentication types in a network. For example, the layer-one network policy server may be configured to check whether a user is a member of the first directory service group and, if so, direct an authentication request to the corresponding layer-two network policy server. If the user is not a member of the first directory service group, then the layer-one network policy server may be configured to check whether a user is a member of the second directory service group and, if so, direct an authentication request to a different corresponding layer-two network policy server. If the user is not a member of either of the first and second directory service groups, then the layer-one network policy server may be configured to send the authentication request to a third corresponding layer-two network policy server. In examples, a user may be a member of more than one directory service group, and the order in which the directory service groups are checked controls the routing of the authentication request for that user. In examples, an administrator may change the order in which the directory service groups are checked by the layer-one network policy server, thereby changing the routing for a user that is a member of multiple directory service groups.

In examples, when a directory service group is an empty set (indicating that no users are currently using a particular authentication type), then the layer-two network policy server for that authentication type can be decommissioned, and any other resources in the network dedicated to supporting that authentication type can be repurposed. In this manner, the systems and methods of the present application permit the addition of new authentication types along with the elegant decommissioning of network infrastructure no longer needed to support a displaced authentication type.

FIG. 1 depicts a system 100 for user registration. In examples, an administrator system 102 provides a registration form to, or configures a registration form for, a registration server 104. The registration form may, for example, include fields for a user identifier (e.g., name, user name, employee number, etc.) and a preferred authentication type. For example, an administrator may dictate, using the form, that any newly registering users must use one of a first authentication type (e.g., an Azure authentication token) or a second authentication type (e.g., a Gemalto authentication token). In examples, previously registering users may have been able to choose a third authentication type—such as a KnownAccess authentication token, but an administrator may edit the registration form to present only the first and second authentication tokens as choices, if the third choice is being phased out by the organization.

In examples, the registration form may be provided to a client computing device 106 (such as a personal computer, phone, tablet, etc.) that is associated with a particular user. The user may fill out the registration form with a user identifier and preferred authentication type and transmit the form to the registration server 104. The registration server 104 shares the user identifier and preferred authentication type with a directory service 112.

The directory service 112 (such as an Active Directory server from Microsoft) may create and maintain directory service groups that list all users that have a particular preferred authentication type. For example, the directory service 112 may maintain an Azure group that lists all users that registered with the Azure authentication type as their preferred authentication type. Similarly, the directory service 112 may also maintain groups for users who registered with other authentication types—such as Gemalto and KnownAccess. Directory service 112 is also operably connected to layer-one network policy server 108. As discussed further below, the layer-one NPS 108 may periodically synchronize with the directory service groups maintained by the directory service 112 to determine how to route authentication requests and/or perform other functions. Although only one layer-one NPS 108 is shown in FIG. 1, it will be appreciated that multiple layer-one NPSs 108 may be employed, and the directory service 112 may share the group information with all layer-one NPS servers that are being employed in the system 100.

Figure 2:
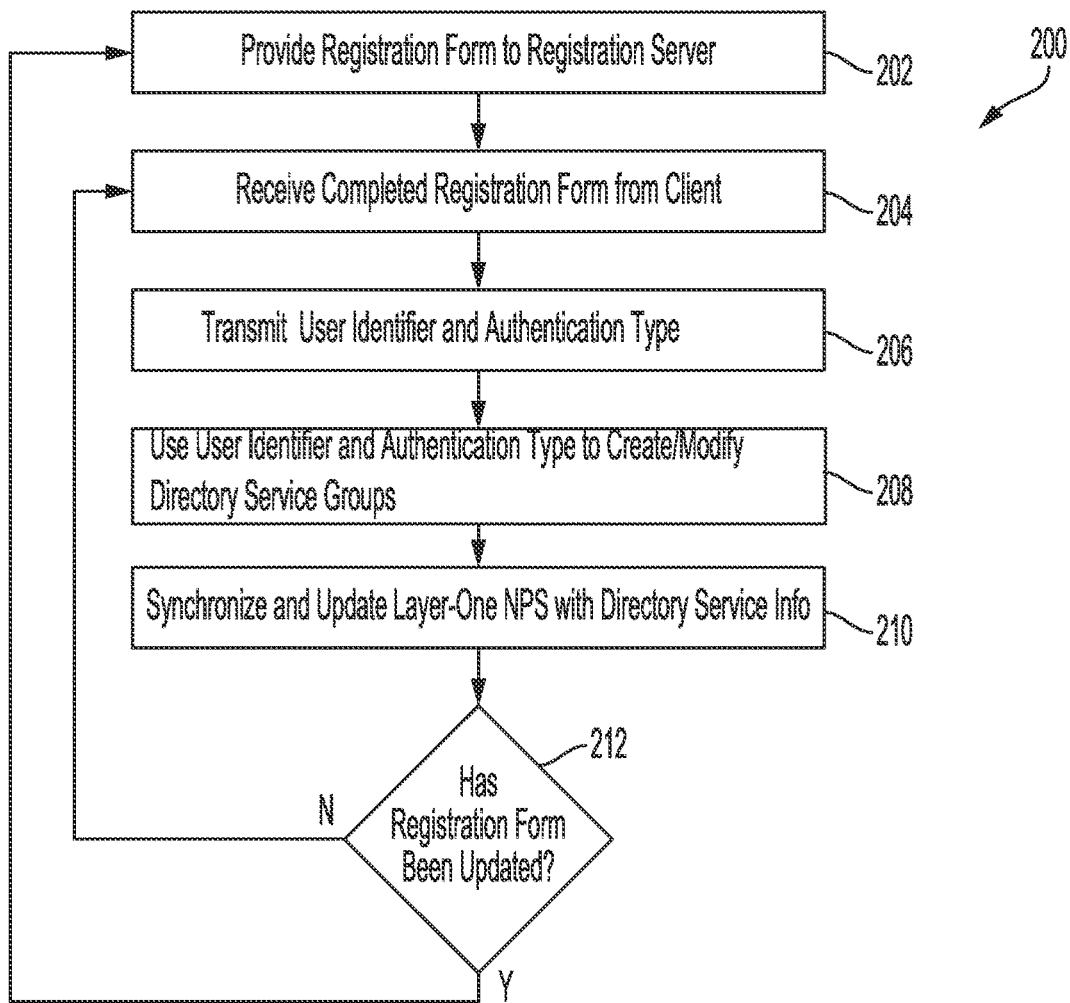
FIG. 2 depicts an example method for registering a user with a network authentication system.

FIG. 2 depicts an example method 200 for registering users. In examples, the method 200 may be performed by one or more elements of system 100 in FIG. 1. At operation 202, a registration form is provided to, or configured on, a registration server. For example, as discussed above, the registration form may include fields for a user identifier (e.g., name, user name, employee number, etc.) and a preferred authentication type. For example, an administrator may dictate, through the design of the form, that any newly registering users must use one of two currently preferred authentication types, such as a first authentication type (e.g., an Azure authentication token) or a second authentication type (e.g., a Gemalto authentication token).

Flow proceeds to operation 204, where a completed registration form is received for a particular user. For example, the registration form may be provided by registration server 104 to a client device 106, where it is completed and returned to registration server 104. The registration server 104 may also provide the completed registration form to directory service 112, which uses the information in the form to create directory service groups based on the users' selections of particular authentication types.

Flow proceeds to operation 206, where a user identifier and authentication type are sent to a directory service. For example, registration server 104 may transmit the user identifier and authentication type from the user registration form to directory service 112.

Flow proceeds to operation 208, where the user identifier and authentication type are used by a directory service to create/update directory service groups. In examples, directory service 112 (such as Active Directory) uses the user identifier and authentication type information to create authentication groups in the directory service—e.g., a first group of all users employing a first type of authentication, a second group of all users employing a second type of authentication, etc. When new information from a newly completed registration form is completed, the groups are updated accordingly.

Flow proceeds to operation 210, where the layer-one NPS is synchronized with the directory service and user identifiers and authentication types are updated. For example, layer-one NPS 108 may periodically synchronize with the information stored at directory service 112. In examples, a user that no longer is employed or associated with an organization may be removed from all directory service groups within the directory service 112. That user will also be removed from synchronized groups maintained at the layer-one NPS 108 when the user identifier and authorization type information is synchronized with the directory service data. As discussed further below, the synchronized directory service data may be used by layer-one NPS 108 to alter a markup language document that controls how the layer-one NPS 108 routes client requests for authentication.

Flow proceeds to operation 212, where it is determined whether the registration form has been updated. For example, administrator system 102 may determine whether a new or edited registration form has been submitted by an administrator. If so, the flow proceeds to operation 202, where the new or updated form is provided to, or modified on, the registration server 104. If not, flow proceeds to operation 204, where the system 200 waits for the next completed registration form to be received.

Figure 3:
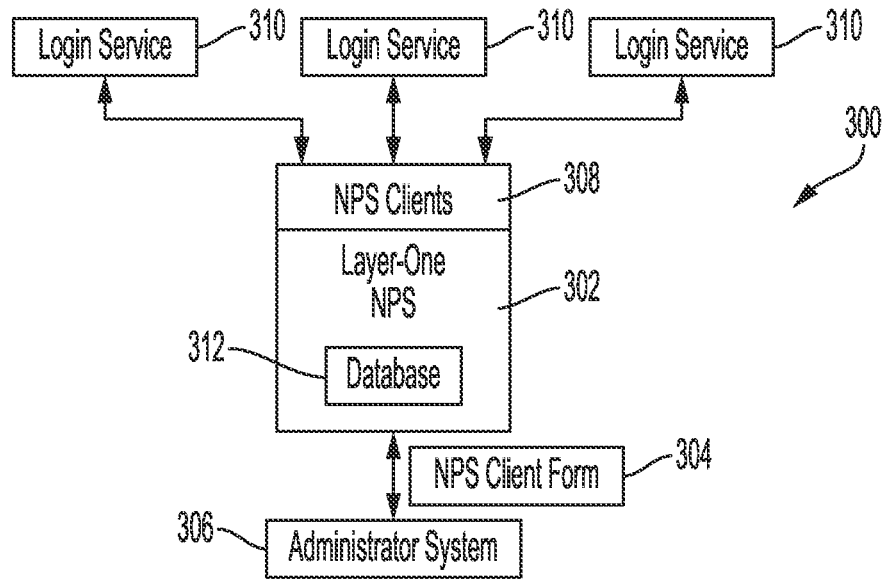
FIG. 3 depicts an example system for generating multiple RADIUS clients according to the present application.

FIG. 3 depicts a system 300 for the generation of RADIUS clients. In examples, RADIUS clients are remote authentication dial-in user service (RADIUS) protocol clients. In examples, RADIUS clients comprise network access services. In order to deploy RADIUS clients, they first must be configured in one or more network policy servers, such as layer-one network policy server 302.

In examples, layer-one network policy server 302 (which may, in examples, be the same layer-one network policy server as layer-one network policy server 108) may provide a RADIUS client form 304 to an administrator computing system 106. In examples, the RADIUS client form 304 may include fields for friendly name, internet protocol (IP) address for the RADIUS client, and a shared secret shared between the RADIUS client and the layer-one network policy server 302 (hereinafter "NPS client information"). The administrator computing system 306 may be used (e.g., by a network administrator) to complete the RADIUS client form 304 and return such form to the layer-one network policy server 302, where the NPS client information may be stored in a database 312 resident on (or accessible to) layer-one network policy server 302. In examples, database 312 is part of layer-one NPS 302 (as pictured). In other examples, the database 312 is separate from (but accessible to) layer-one NPS 302, and storing the information in database 312 further comprises transmitting the information from layer-one NPS 302 to the database 312. In this manner, a network administrator may dictate the types of RADIUS clients that are created by system 300.

In examples, layer-one network policy server 302 extracts in the NPS client information from database 312 in order to programmatically create RADIUS clients 308. RADIUS clients 308 allow login services 310 (such as, e.g., Citrix servers, jump hosts, etc.) to establish trust with layer-one NPS 302. In examples, the RADIUS clients 308 are provisioned and deployed automatically based on the NPS client information in database 312. System 300 effectively allows NPS client information to be ingested via a form 304, stored into a database 312, and used to generate multiple (even thousands) of RADIUS clients 308 simultaneously and automatically rather than manually. Login services 310, in examples, are services to which clients attempting to authenticate through layer-one network policy server 302 provide credentials. For example, login services 310 may comprise jump hosts, Citrix servers/web portals, etc. After a RADIUS client is established for a particular login service 310, the login service 310 may then effectively redirect authentication traffic to layer-one NPS 302 when a client machine attempts to authenticate.

Figure 4:
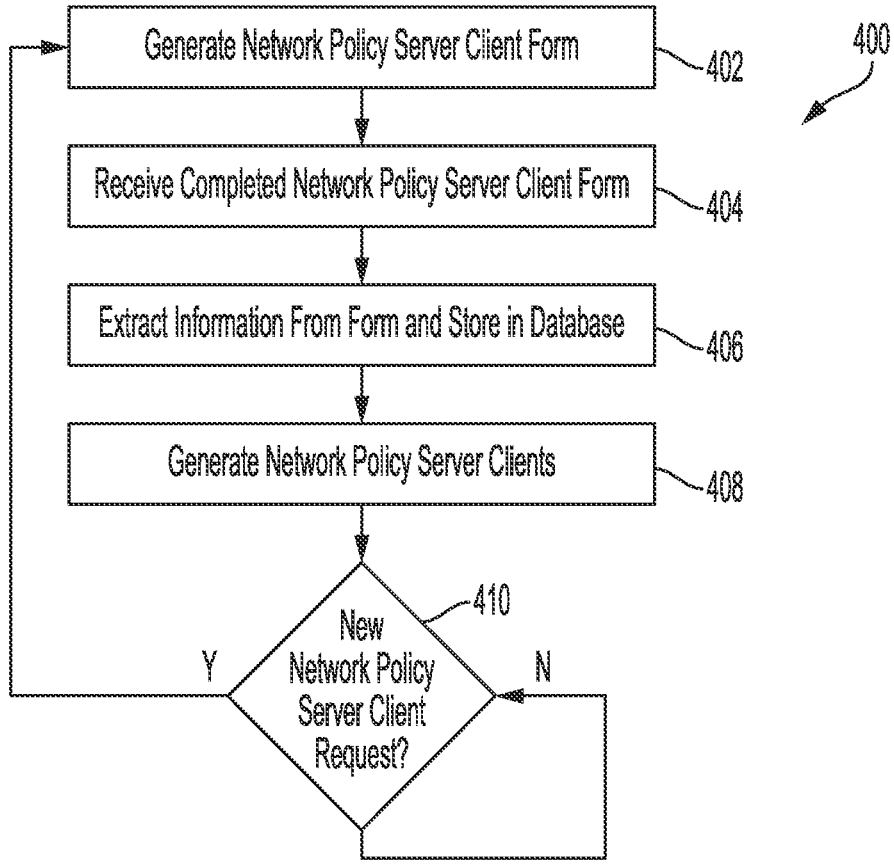
FIG. 4 depicts an example method for generating multiple RADIUS clients according to the present application.

FIG. 4 is an example method 400 for generating RADIUS clients. Flow begins at operation 402, where a RADIUS client form is generated. For example, layer-one NPS 302 may generate RADIUS client form 304 and send it to administrator computing system 306. At operation 404, a completed RADIUS client form is received. For example, layer-one NPS 302 may receive a completed RADIUS client form 304 from administrator computing system 306, including NPS client information related to login servers, such as login servers 310. At operation 406, the NPS client information may be extracted from the network policy client form and stored in a database. For example, layer-one NPS 302 may store the extracted NPS client information in database 312 along with entries for other RADIUS clients.

At operation 408, RADIUS clients are generated. For example, layer-one NPS 302 may access database 312 and determine if any new NPS client information entries have been added. If so, the layer-one NPS 302 uses the NPS client information (e.g., friendly name, IP address, shared secret) to generate new RADIUS client(s) 308. At operation 410, it is determined whether another RADIUS client has been requested. If so, the method proceeds back to operation 402, where the RADIUS client form is generated and provided to an administrator system 306. If not, the method periodically rechecks operation 410 to determine if another RADIUS client has been requested until such request is received.

Figure 5:
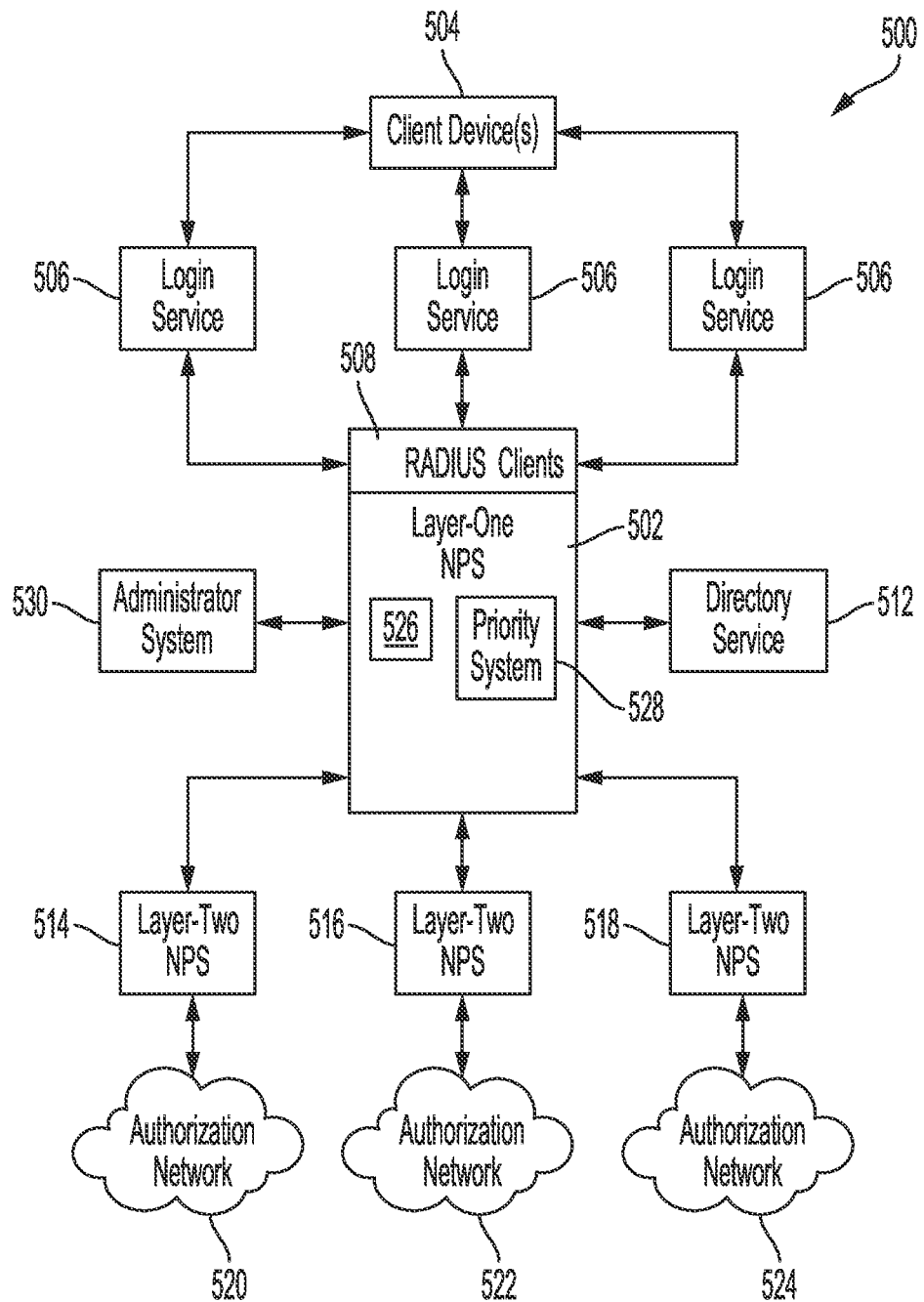
FIG. 5 depicts an example system for managing multiple authentication methods according to the present application.

FIG. 5 depicts an example system 500 for managing multiple authentication methods within a network. A layer-one NPS server 502 is provided for routing authentication requests from one or more client devices 504. Although only one layer-one NPS server 502 and one client device 504 are shown in FIG. 5, it will be appreciated that multiple of each may be provided. Layer-one network policy server 502 may, in examples, be the same layer-one network policy server as layer-one network policy server 108 and/or 302.

In examples, a user associated with client device 504 may attempt to access a network for which system 500 provides authentication services. As discussed in relation to FIGS. 3 and 4 above, the client device 504 may present user identifying information and credentials in an authentication request to one of login services 506, each of which has a corresponding RADIUS client 508 at layer-one NPS 502. Each login service 506 may be programmed to redirect authentication requests to layer-one NPS 502 through its corresponding RADIUS client 508.

Upon receipt of an authentication request (including identifying information), the layer-one NPS 502 may determine how to route the request based on the identity of the requesting user. For example, as discussed above in relation to FIGS. 1 and 2, layer-one NPS 502 may be synchronized with a directory service 512. For example, as discussed in relation to FIGS. 1 and 2, the directory service 512 may include a list of all users authorized to access the network for which authentication is sought. In addition, the directory service 512 may maintain current lists of users that have enrolled for a particular authentication type. For example, if the directory service 512 is Active Directory from Microsoft, the Active Directory may maintain separate Active Directory groups of users for each authentication type that is supported by system 500.

Layer-one NPS 502 may, in examples, periodically synchronize (e.g., every twenty minutes) with the lists of users for particular authentication types maintained in the directory service 512. For example, directory service 512 may maintain a first directory service group of all users that have enrolled to use a first type of network authentication (such as Microsoft Azure). The directory service 512 may also maintain a second directory service group of all users that have enrolled to use a second type of network authentication (such as Gemalto). The directory service 512 may also maintain a third directory service group of all users that have enrolled to use a third type of network authentication (such as KnownAccess). In examples, the third directory service group may also include any users who have not specifically enrolled to use a particular authentication type. In examples, the first, second, and third authentication types are used as part of a multi-factor authentication system that also requires the user to provide a valid user name and password in order to be authenticated.

When synchronizing, layer-one NPS 502 may retrieve all of the user names of users in each of the directory service groups for the authentication types. In addition, layer-one NPS 502 may also maintain connection information for each authentication type. For example, layer-one NPS 502 may store the IP address(es) for one or more layer-two NPS(s) 514, 516, 518 for each of the authentication types. Layer-two NPS(s) 514, 516, and 518 operate as network authenticators of a particular authentication types and may interact with back-end or external systems, such as external authorization services 520, 522, and 524 to determine if credentials presented by a client (such as an authentication token) are valid for that authentication type.

In the particular example shown in FIG. 5, layer-two NPS 514 operates to process authentication requests of the first type. As such, if a requesting user is enrolled to use the first authentication type, that user's request will be routed by layer-one NPS 502 to layer-two NPS 514. Layer-two NPS 514 may then interact with one or more of the directory service 512 (to check the user's user name and password) and an external authorization service 520 to determine if the credentials presented (e.g., an authentication token of the first authentication type) are valid. For simplicity a connection is not shown between layer-two NPSs 514, 516, and 518 and directory service 512, but in operation those systems may be operatively connected. Similarly, if a requesting user is enrolled to use a second authentication type, that user's request will be routed by layer-one NPS 502 to layer-two NPS 516. Layer-two NPS 516 may then interact with one or more of the directory service 512 (to check the user's user name and password) and an external authorization service 522 to determine if the credentials presented (e.g., an authentication token of the second authentication type) are valid. Similarly, if a requesting user is enrolled to use a third authentication type, that user's request will be routed by layer-one NPS 502 to layer-two NPS 518. Layer-two NPS 518 may then interact with one or more of the directory service 512 (to check the user's user name and password) and an external authorization service 524 to determine if the credentials presented (e.g., an authentication token of the third authentication type) are valid.

In examples, the routing of authentication requests to the appropriate layer-two NPS 514, 516, or 518, is accomplished by programming the layer-one NPS 502 to (a) extract user names for each directory service group (corresponding to each authentication type) from directory service 512 and (b) insert the user names into a markup document, such as an extensible application markup language (XAML) document 526 stored at layer-one NPS 502. Layer-one NPS 502 also stores connection information (e.g., IP addresses for layer-two NPS 514, 516, and 518) for each of the authentication types to route authentication requests to the appropriate layer-two NPS 514, 516, or 518, depending on the authentication type being employed. In examples, the XAML document 526 is updated each time the layer-one NPS 502 synchronizes with directory service 512, or it may be updated at different times or only when a change is made to directory service group information stored at directory service 512.

In examples, when the authentication request is received from client 504, it includes identifying information (such as a user name, user identifier, etc.), and the XAML document 526 is checked to determine if the user name appears in the first directory service group corresponding to the first authentication type. If the user name does appear in the first directory service group, then the authentication request is forwarded to layer-two NPS 514, and no further directory-service-group checks are made.

If the user name does not appear in the first directory service group, then the XAML document 526 is checked to determine if the user name appears in the second directory service group corresponding to the second authentication type. If the user name does appear in the second directory service group, then the authentication request is forwarded to layer-two NPS 516, and no further directory-service-group checks are made.

If the user name does not appear in the second directory service group, then the XAML document 526 is checked to determine if the user name appears in the third directory service group corresponding to the third authentication type. If the user name does appear in the second directory service group, then the authentication request is forwarded to layer-two NPS 518, and no further checks are made. If the user name does not appear in the third directory service group, then the user may be prompted to register for a particular authentication type, or the third authentication type may be considered a default for any users that are not enrolled in a particular group, and the authentication request may be forwarded to the layer-two NPS 518 in any event.

In examples, the layer-one NPS 502 may also include a priority system 528, which may comprise a software or hardware module that determines the order in which particular directory service groups will be checked to determine where to forward the authentication request. For example, an administrator computing system 530 may be provided with a user interface to prioritize the preferred authentication types permitted in system 500. The user interface may be used to set the order of preference, for example, to use the first authentication type if possible, and then the second authentication type only if the first authentication type is not possible, and then the third authentication type only if neither of the first and second authentication types are possible.

In examples, the user interface of the administrator computing system may also be used to reprogram the priority system 528 to re-prioritize the authentication types. For example, the user interface may be used to set the order of preference to use the second authentication type if possible, and then the first authentication type only if the second authentication type is not possible, and then the third authentication type only if neither of the first and second authentication types are possible. The priority maintained by priority system 528 may be included in the XAML document 526 to cause layer-one NPS 502 to route authentication requests to the appropriate layer-two NPS 514, 516, or 518, based on the re-programmed priorities.

Layer-two NPSs 514, 516, 518 may communicate with other systems to determine whether the user can be successfully authenticated. For example, layer-two NPS 514 may send the user's authentication token to authorization network 520 to determine if the authentication token is valid. In addition, layer-two NPS 514 may also communicate with directory service 512 to determine if the user name and password provided in the authentication request are valid. Similarly, layer-two NPS 516 may communicate with authorization network 522 and directory service 512, and layer-two NPS 518 may communicate with authorization network 524 and directory service 512 in evaluating authentication requests. In examples, an authentication response is eventually received at layer-one NPS from one of layer-two NPS 514, 516, or 518 and returned to the client device 504. If the authentication is successful, the client device is permitted to access the network for which system 500 provides authentication services. Otherwise, access is denied.

In examples, a user may be a member of more than one directory service group, and the order in which the directory service groups are checked controls the routing of the authentication request for that user. As such, an administrator may change the order in which the directory service groups are checked by the layer-one network policy server, thereby changing the routing for a user that is a member of multiple directory service groups. In addition, because the authentication type groups are directly tied to the directory service groups, when a user is deleted from the directory service (e.g., an employee leaves a company and access to the company network is discontinued), that user is automatically deleted also from the list of users employing a particular type of authentication. Over time, this allows for older authentication types to be naturally phased out in favor of prioritized authentication types.

In examples, when the number of members in a directory service group reaches an upper or lower threshold, components of the system 500 that support the authentication type associated with that directory service group may be commissioned/decommissioned, as necessary. For one specific example, if a directory service group for a particular authentication type is an empty set (indicating that no users are currently using a particular authentication type), then the layer-two NPS for that authentication type (e.g., 514, 516, 518) can be decommissioned, and any other resources in the network dedicated to supporting that authentication type can be repurposed. In examples, the decommissioning of certain layer-two NPS components may happen automatically based on the number of users in a particular directory service group for the corresponding authentication type falling below a particular threshold. In this manner, the systems and methods of the present application permit the addition and prioritization of new authentication types along with the elegant decommissioning of network infrastructure no longer needed to support a displaced authentication type.

Figure 6A:
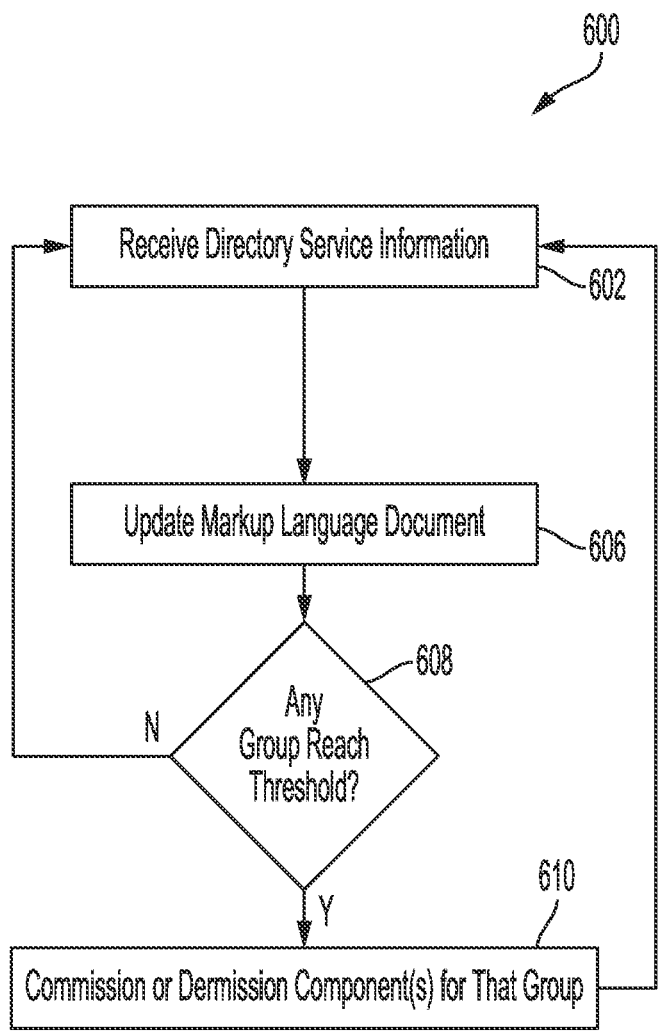
FIG. 6A depicts an example method for updating a network policy server based on directory service information.

FIG. 6A depicts an example method 600 for updating a network policy server based on directory service information. At operation 602, directory service information is received. For example, layer-one NPS 502 may periodically receive updated directory service information from directory service 512. The updated directory service information may include a list of user identifiers (such as user names) that are stored by the directory service 512 in groups (such as Active Directory Groups) associated with particular authentication types. For example, and as further explained above, the directory service 512 may maintain a first group of user names that have enrolled to participate in a first authentication type (first directory service group), a second group of user names that have enrolled to participate in a second authentication type (second directory service group), and a third group of user names that have enrolled to participate in a third authentication type (third directory service group). More or fewer groups than three are possible. The directory service information that is received may comprise the entire list of user identifiers for each directory service group, or only changes since the most recent update was received from the directory service 512. Updates to directory service group memberships may be caused by updates to the authentication types that the user has chosen to enroll in as well as updates to whether a particular user has been added or deleted from the directory service 512 (e.g., a new employee or departing employee).

At operation 606, a markup language document may be updated. For example, as discussed, layer-one NPS 502 may store a markup language document 526 (such as an XAML document) that is used by layer-one NPS 502 to route incoming authentication requests. The markup language document 606 may be updated by updating the user identifiers (such as user names) that appear in each of the directory service groups maintained for individual authentication types.

At operation 608, a determination is made whether any of the directory service group associated with a particular authentication type has reached a threshold. For example, layer-one NPS may maintain thresholds for directory service groups that, when reached, will cause components of the network to be commissioned or decommissioned at operation 610. In one example, if members have been added to a directory service group such that an additional layer-two NPS for that authentication type is needed or desired, then upper thresholds may be set to cause the commissioning of additional components to support the expanding directory service group for that authentication type. By the same token, if multiple layer-two NPS(s) are deployed, but the number of members in a directory service group for that authentication type is dropping, then lower thresholds may be set to cause one or more components to be decommissioned when the threshold his met. In one example, if the directory service information received at operation 602 indicates that one directory service group for a particular authentication type is now a null set (no members) or below a particular threshold, all layer-two NPS(s) for that authentication type may be decommissioned and/or repurposed and the system may cease supporting that authentication type altogether. In examples, commissioning/decommissioning of components may occur programmatically and without human intervention. In other examples, a notification may be sent to an operator to confirm whether components should be commissioned or decommissioned. If no components are to be commissioned/decommissioned, or after such components are commissioned/decommissioned, flow proceeds back to operation 602, where a new update to the directory service information may be received.

Figure 6B:
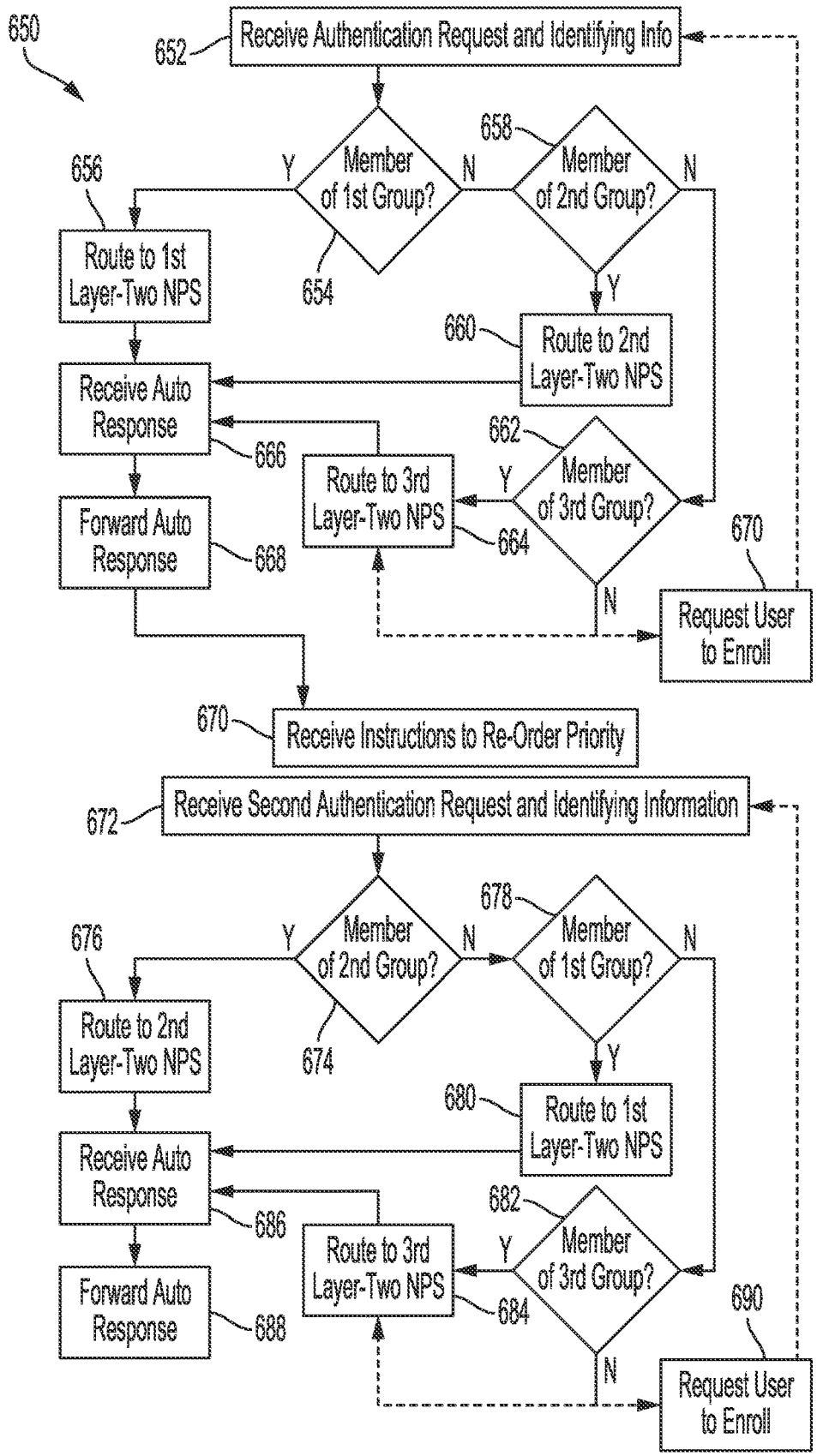
FIG. 6B depicts an example method for managing multiple authentication methods according to the present application.

FIG. 6B depicts an example method for managing multiple authentication methods according to the present application. At operation 652, an authentication request is received that includes identifying information. In examples, the identifying information includes a user identifier (such as a user name) and/or user credentials, such as a password, etc. In examples, the authentication request is received from a client device 504 associated with the user through a login service 506 and one of the RADIUS clients 508 at layer-one NPS 502.

At operation 654, a determination is made whether the user is a member of a first directory service group. For example, layer-one NPS 502 may review markup language document 526, which has been updated with information about the directory service groups that directory service 512 maintains for users that have enrolled in particular authentication types.

If the user is a member of the first directory service group, then flow proceeds to operation 656, where the request is routed to a first layer-two NPS. For example, layer-one NPS 502 may forward the request to layer-two NPS 514, which services requests for the authentication type associated with the first directory service group.

If the user is not a member of the first directory service group, then flow proceeds to operation 658, where a determination is made whether the user is a member of a second directory service group. For example, layer-one NPS 502 may review markup language document 526, which has been updated with information about the directory service groups that directory service 512 maintains for users that have enrolled in particular authentication types.

If the user is a member of the second directory group, flow proceeds to operation 660, where the request is routed to a second layer-two NPS. For example, layer-one NPS 502 may forward the request to layer-two NPS 516, which services requests for the authentication type associated with the second directory service group.

If the user is not a member of the second directory service group, then flow proceeds to operation 662, where a determination is made whether the user is a member of a third directory service group. For example, layer-one NPS 502 may review markup language document 526, which has been updated with information about the directory service groups that directory service 512 maintains for users that have enrolled in particular authentication types.

If the user is a member of the third directory group, flow proceeds to operation 664, where the request is routed to a third layer-two NPS. For example, layer-one NPS 502 may forward the request to layer-two NPS 518, which services requests for the authentication type associated with the third directory service group.

If the user is not a member of the third directory service group, then flow proceeds to one of operation 664 or, optionally, operation 670. For example, in some embodiments, authentication requests from any user that is not a member of either of the first or second directory services groups will automatically be routed to the third layer-two NPS (at operation 664) as a default for all unassigned users. In other examples, a user may be prompted to enroll in a particular authentication type (as described, e.g., in relation to FIGS. 1 and 2), and flow proceeds back to operation 652.

Flow from any of operations 656, 660, and 664 proceeds to operation 666, where an authentication response is received. For example, layer-one NPS 502 may receive an authentication response from one of layer-two NPS 514, 516, or 518. Flow then proceeds to operation 668, where the authentication response is forwarded to the client, such as client 504.

Continuing from operation 668, in this example, instructions are received at operation 670 to re-order the priority of authentication types. For example, an administrator system 530 may receive instructions through a user interface that an administrator desires that the second authentication type should be prioritized over the first authentication type. As such, the priority system 528 receives the instructions and updates the markup language document 526 to cause the second directory service group to be checked prior to the first directory service group when routing authentication requests.

At operation 672, an authentication request is received that includes identifying information. In examples, the identifying information includes the same user identifier (such as a user name) and/or user credentials, such as a password, that was received at operation 652, however, the request is routed differently. In examples, the authentication request is received from a client device 504 associated with the user through a login service 506 and one of RADIUS clients 508 at layer-one NPS 502.

At operation 674, a determination is made whether the user is a member of the second directory service group. For example, layer-one NPS 502 may review markup language document 526, which has been updated with information about the directory service groups that directory service 512 maintains for users that have enrolled in particular authentication types.

If the user is a member of the second directory service group, then flow proceeds to operation 676, where the request is routed to the second layer-two NPS. For example, layer-one NPS 502 may forward the request to layer-two NPS 516, which services requests for the authentication type associated with the second directory service group.

If the user is not a member of the second directory service group, then flow proceeds to operation 678, where a determination is made whether the user is a member of the first directory service group. For example, layer-one NPS 502 may review markup language document 526, which has been updated with information about the directory service groups that directory service 512 maintains for users that have enrolled in particular authentication types.

If the user is a member of the first directory group, flow proceeds to operation 680, where the request is routed to the first layer-two NPS. For example, layer-one NPS 502 may forward the request to layer-two NPS 514, which services requests for the authentication type associated with the second directory service group.

If the user is not a member of the first directory service group, then flow proceeds to operation 682, where a determination is made whether the user is a member of the third directory service group. For example, layer-one NPS 502 may review markup language document 526, which has been updated with information about the directory service groups that directory service 512 maintains for users that have enrolled in particular authentication types.

If the user is a member of the third directory group, flow proceeds to operation 684, where the request is routed to the third layer-two NPS. For example, layer-one NPS 502 may forward the request to layer-two NPS 518, which services requests for the authentication type associated with the third directory service group.

If the user is not a member of the third directory service group, then flow proceeds to one of operation 684 or, optionally, operation 690. For example, in some embodiments, authentication requests from any user that is not a member of either of the first or second directory services groups will automatically be routed to the third layer-two NPS (at operation 684) as a default for all unassigned users. In other examples, a user may be prompted to enroll in a particular authentication type (as described, e.g., in relation to FIGS. 1 and 2), and flow proceeds back to operation 672.

Flow from any of operations 676, 680, and 684 proceeds to operation 686, where an authentication response is received. For example, layer-one NPS 502 may receive an authentication response from one of layer-two NPS 514, 516, or 518. Flow then proceeds to operation 688, where the authentication response is forwarded to the client, such as client 504.

Figure 7:
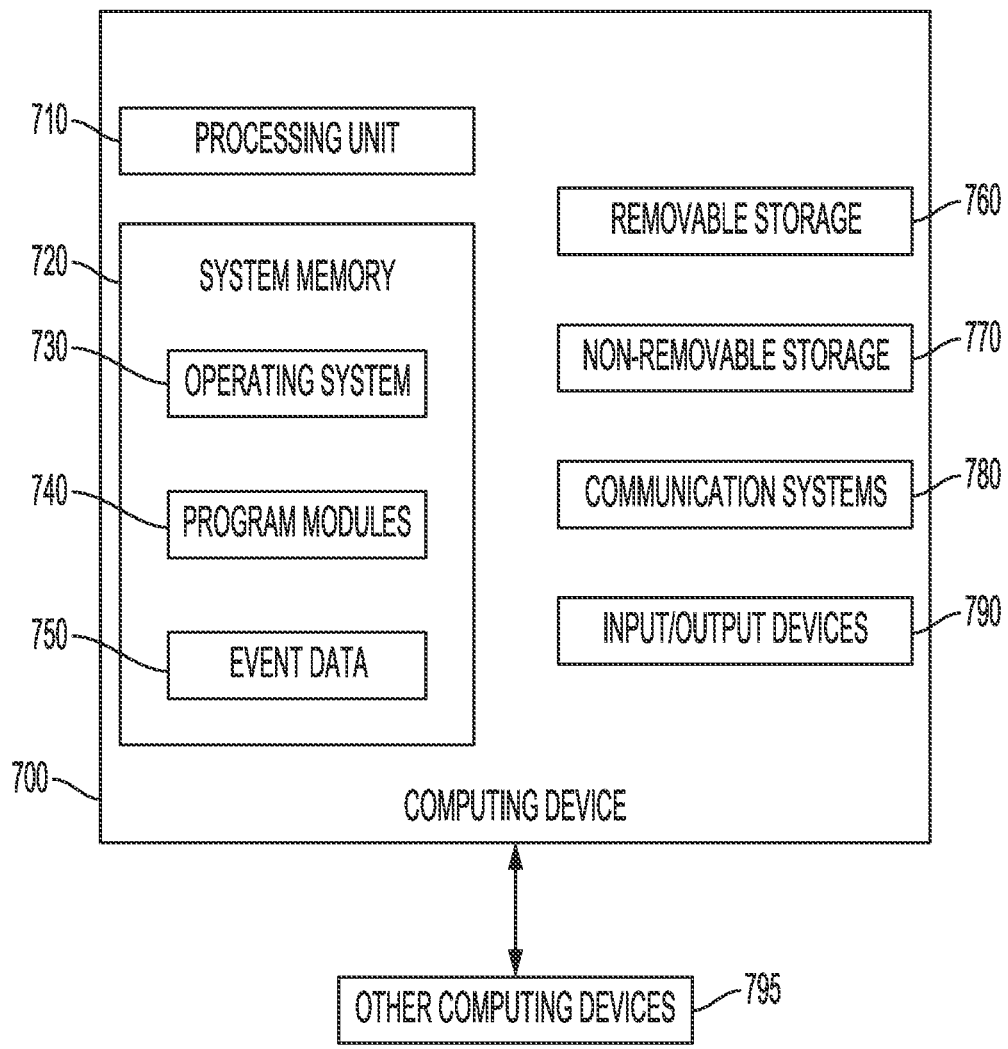
FIG. 7 depicts an example computing device according to the present application.

FIG. 7 depicts an example computing device 700 according to the present application. The computing device 700, or various components and systems of the computing device 700, may be integrated or associated with layer-one NPS 502, layer-two NPSs 514, 516, 518, administrator system 530, client device(s) 504, login service(s) 506, directory service 512, etc. As shown in FIG. 7, the physical components (e.g., hardware) of the computing device are illustrated and these physical components may be used to practice the various aspects of the present disclosure.

The computing device 700 may include at least one processing unit 710 and a system memory 720. The system memory 720 may include, but is not limited to, volatile storage (e.g., random access memory), non-volatile storage (e.g., read-only memory), flash memory, or any combination of such memories. The system memory 720 may also include an operating system 730 that controls the operation of the computing device 700 and one or more program modules 740. The program modules 740 may be responsible for gathering or determining event data 750 including endpoint data and/or network data. A number of different program modules and data files may be stored in the system memory 720. While executing on the processing unit 710, the program modules 740 may perform the various processes described above.

The computing device 700 may also have additional features or functionality. For example, the computing device 700 may include additional data storage devices (e.g., removable and/or non-removable storage devices) such as, for example, magnetic disks, optical disks, or tape. These additional storage devices are labeled as a removable storage 760 and a non-removable storage 770.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 7 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 700 on the single integrated circuit (chip). The disclosure may also be practiced using other technologies capable of performing logical operations such as, for example, AND, OR, and NOT, including but not limited to mechanical, optical, fluidic, and quantum technologies.

The computing device 700 may include one or more communication systems 780 that enable the computing device 700 to communicate with other computing devices 795 such as, for example, servers, routers, network devices, client computing devices, etc. Examples of communication systems 780 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 700 may also have one or more input devices and/or one or more output devices shown as input/output devices 790. These input/output devices 790 may include a keyboard, a sound or voice input device, haptic devices, a touch, force and/or swipe input device, a display, speakers, etc. The aforementioned devices are examples and others may be used.

The term computer-readable media as used herein may include both communication media and non-transitory computer storage media. Computer storage media may include volatile and nonvolatile, removable and non-removable media implemented in any method or technology for storage of information, such as computer readable instructions, data structures, or program modules.

The system memory 720, the removable storage 760, and the non-removable storage 770 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media is nontransitory does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure." Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for protecting computing systems using declared constraints have been specifically described and illustrated herein, many modifications and variations will be apparent to those skilled in the art. Accordingly, it is to be understood systems and methods for protecting computing systems using declared constraints constructed according to principles of this disclosure may be embodied other than as specifically described herein. The disclosure is also defined in the following claims, and equivalents thereof

We claim:

1. A method for authenticating a user of a computing network, comprising:
   receiving, at a layer-one network policy server, information from a directory service;
   receiving, at the layer-one network policy server, an authentication request from a client computing device associated with a user, the authentication request including identifying information;
   extracting, at the layer-one network policy server, data from the information received from the directory service;
   inserting the extracted data into a markup language document at the layer-one network policy server;
   determining, by the layer-one network policy server and based on the identifying information and the information from the directory service, whether the user is a member of a first directory service group, wherein the determining whether the user is a member of a first directory service group is based on the markup language document;
      when the user is a member of the first directory service group, routing the request to a first layer-two network policy server operating as a first type of network authenticator;
      when the user is not a member of the first directory service group, determining whether the user is a member of a second directory service group;
         when the user is a member of the second directory service group, routing the request to a second layer-two network policy server operating as a second type of network authenticator;
         when the user is not a member of the second directory service group, routing the request to a third layer-two network policy server operating as a third type of network authenticator;
   receiving an authentication response at the layer-one network policy server;
   providing the authentication response to the client computing device;
   periodically receiving updated information from the directory service; and
   updating the markup language document at the layer-one network policy server based on the updated information from the directory service.

2. The method of claim 1, further comprising, prior to receiving the authentication request:
   providing an authentication type enrollment form;
   receiving an authentication type selection and the identifying information;
   providing the authentication type selection and the identifying information to the directory service; and
   synchronizing the markup language document with information from the directory service.

3. The method of claim 1, further comprising, prior to receiving the authentication request:
   generating, by the layer-one network policy server, a first RADIUS client adapted to communicate with a first login service;
   generating, by the layer-one network policy server, a second RADIUS client adapted to communicate with a second login service; and
   generating, by the layer-one network policy server, a third RADIUS client adapted to communicate with a third login service.

4. The method of claim 3, wherein each of the first RADIUS client, the second RADIUS client, and the third RADIUS client is a remote authentication dial-in user service (RADIUS) client.

5. The method of claim 3, further comprising:
   providing a form adapted to receive a name, shared secret, and an electronic address for each of the first RADIUS client, the second RADIUS client, and the third RADIUS client;
   receiving the form; and
   generating the first RADIUS client, the second RADIUS client, and the third RADIUS client based on the form.

6. The method of claim 3, further comprising:
   determining that the first directory service group is an empty set;
   based on determining that the first directory service group is an empty set, decommissioning the first layer-two network policy server and deactivating the first RADIUS client.

7. The method of claim 1, further comprising:
   receiving, at the layer-one network policy server, instructions to change priority of the layer-two network policy servers;
   receiving, at the layer-one network policy server, a second authentication request from the user including the identifying information;
   determining, by the layer-one network policy server and based on the identifying information and the information from the directory service, whether the user is a member of the second directory service group;
      when the user is a member of the second directory service group, routing the request to the second layer-two network policy server operating as the second type of network authenticator;
      when the user is not a member of the second directory service group, determining whether the user is a member of the first directory service group;
         when the user is a member of the first directory service group, routing the request to the first layer-two network policy server operating as the first type of network authenticator;
         when the user is not a member of the first directory service group, routing the request to the third layer-two network policy server operating as the third type of network authenticator;
   receiving a second authentication response at the layer-one network policy server; and
   providing the second authentication response to the client device for the user.

8. A system for authenticating a user of a computing network, comprising:
   at least one processor; and
   memory, operatively connected to the at least one processor and storing instructions that, when executed by the at least one processor, cause the system to perform a method, the method comprising:
      receiving, at a layer-one network policy server, information from a directory service;

receiving, at the layer-one network policy server, an authentication request from a client computing device associated with a user, the authentication request including identifying information;

extracting, at the layer-one network policy server, data from the information received from the directory service;

inserting the extracted data into a markup language document at the layer-one network policy server;

determining, by the layer-one network policy server and based on the identifying information and the information from the directory service, whether the user is a member of a first directory service group, wherein the determining whether the user is a member of a first directory service group is based on the markup language document;

when the user is a member of the first directory service group, routing the request to a first layer-two network policy server operating as a first type of network authenticator;

when the user is not a member of the first directory service group, determining whether the user is a member of a second directory service group;

when the user is a member of the second directory service group, routing the request to a second layer-two network policy server operating as a second type of network authenticator;

when the user is not a member of the second directory service group, routing the request to a third layer-two network policy server operating as a third type of network authenticator;

receiving an authentication response at the layer-one network policy server;

providing the authentication response to the client computing device;

periodically receiving updated information from the directory service; and updating the markup language document at the layer-one network policy server based on the updated information from the directory service.

9. The system of claim 8, wherein the method further comprises, prior to receiving the authentication request:
providing an authentication type enrollment form;
receiving an authentication type selection and the identifying information;
providing the authentication type selection and the identifying information to the directory service; and
synchronizing the markup language document with information from the directory service.

10. The system of claim 8, wherein the method further comprises, prior to receiving the authentication request:
generating, by the layer-one network policy server, a first RADIUS client adapted to communicate with a first login service;
generating, by the layer-one network policy server, a second RADIUS client adapted to communicate with a second login service; and
generating, by the layer-one network policy server, a third RADIUS client adapted to communicate with a third login service.

11. The system of claim 10, wherein each of the first RADIUS client, the second RADIUS client, and the third RADIUS client is a remote authentication dial-in user service (RADIUS) client.

12. The system of claim 10, wherein the method further comprises:

providing a form adapted to receive a name, shared secret, and an electronic address for each of the first RADIUS client, the second RADIUS client, and the third RADIUS client;
receiving the form; and
generating the first RADIUS client, the second RADIUS client, and the third RADIUS client based on the form.

13. The system of claim 10, wherein the method further comprises:
determining that the first directory service group is an empty set;
based on determining that the first directory service group is an empty set, decommissioning the first layer-two network policy server and deactivating the first RADIUS client.

14. The system of claim 8, wherein the method further comprises:
receiving, at the layer-one network policy server, instructions to change priority of the layer-two network policy servers;
receiving, at the layer-one network policy server, a second authentication request from the user including the identifying information;
determining, by the layer-one network policy server and based on the identifying information and the information from the directory service, whether the user is a member of the second directory service group;
when the user is a member of the second directory service group, routing the request to the second layer-two network policy server operating as the second type of network authenticator;
when the user is not a member of the second directory service group, determining whether the user is a member of the first directory service group;
when the user is a member of the first directory service group, routing the request to the first layer-two network policy server operating as the first type of network authenticator;
when the user is not a member of the first directory service group, routing the request to the third layer-two network policy server operating as the third type of network authenticator;
receiving a second authentication response at the layer-one network policy server; and
providing the second authentication response to the client device for the user.

15. A method for authenticating a user of a computing network, comprising:
receiving, at a layer-one network policy server, information from a directory service;
receiving, at the layer-one network policy server, an authentication request from a client computing device associated with a user, the authentication request including identifying information;
extracting, at the layer-one network policy server, data from the information received from the directory service;
inserting the extracted data into a markup language document at the layer-one network policy server;
determining, by the layer-one network policy server and based on the identifying information and the information from the directory service, whether the user is a member of a first directory service group, wherein the determining whether the user is a member of a first directory service group is based on the markup language document;

when the user is a member of the first directory service group, routing the request to a first layer-two network policy server operating as a first type of network authenticator;

when the user is not a member of the first directory service group, determining whether the user is a member of a second directory service group;

when the user is a member of the second directory service group, routing the request to a second layer-two network policy server operating as a second type of network authenticator;

when the user is not a member of the second directory service group, routing the request to a third layer-two network policy server operating as a third type of network authenticator;

receiving an authentication response at the layer-one network policy server;

providing the authentication response to the client computing device;

determining that the first directory service group is an empty set;

based on determining that the first directory service group is an empty set, decommissioning the first layer-two network policy server;

periodically receiving updated information from the directory service; and updating the markup language document at the layer-one network policy server based on the updated information from the directory service.

\* \* \* \* \*